United States Patent
Majka

(10) Patent No.: US 10,214,794 B2
(45) Date of Patent: Feb. 26, 2019

(54) METHOD FOR MANUFACTURING COMPONENTS FOR GAS TURBINE ENGINES

(71) Applicant: General Electric Company, Schenectady, NY (US)

(72) Inventor: Theodore Francis Majka, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 323 days.

(21) Appl. No.: 15/289,530

(22) Filed: Oct. 10, 2016

(65) Prior Publication Data

US 2018/0100210 A1 Apr. 12, 2018

(51) Int. Cl.
| | | |
|---|---|---|
| *C21D 1/18* | (2006.01) |
| *C21D 9/00* | (2006.01) |
| *C21D 6/00* | (2006.01) |
| *C21D 1/52* | (2006.01) |
| *C21D 1/42* | (2006.01) |
| *C22C 38/52* | (2006.01) |
| *C22C 38/44* | (2006.01) |
| *F04D 29/02* | (2006.01) |
| *B23P 15/02* | (2006.01) |
| *B21K 3/04* | (2006.01) |
| *F04D 29/32* | (2006.01) |
| *F04D 29/54* | (2006.01) |

(52) U.S. Cl.
CPC ............. *C21D 9/0068* (2013.01); *B21K 3/04* (2013.01); *B23P 15/02* (2013.01); *C21D 1/18* (2013.01); *C21D 1/42* (2013.01); *C21D 1/52* (2013.01); *C21D 6/004* (2013.01); *C21D 6/007* (2013.01); *C22C 38/44* (2013.01); *C22C 38/52* (2013.01); *F04D 29/023* (2013.01); *F04D 29/324* (2013.01); *F04D 29/542* (2013.01); *F05D 2230/25* (2013.01); *F05D 2230/40* (2013.01); *F05D 2230/41* (2013.01); *F05D 2300/171* (2013.01)

(58) Field of Classification Search
CPC ........ C21D 9/0068; C21D 6/007; C21D 1/52; C21D 1/42; C21D 1/18; C22C 38/52; C22C 38/44; B23P 15/02; F04D 29/388; F04D 29/023; B21K 3/04
See application file for complete search history.

(56) References Cited

U.S. PATENT DOCUMENTS

2016/0251737 A1 9/2016 Majka

*Primary Examiner* — Jessee R Roe
(74) *Attorney, Agent, or Firm* — Mark E. Henderson; Ernest G. Cusick; Frank A. Landgraff

(57) ABSTRACT

A method of manufacturing a component for a gas turbine engine. The method may include the steps of: providing a forged preform of the component that is made from a stainless steel alloy; identifying two non-overlapping portions of the component that together form a whole of the component: a target portion and a remainder portion; and treating the component with a regionally selective tempering process in which a treated region receives a tempering process while an untreated region is excluded from receiving the tempering process. The target portion may be the treated region while the remainder portion is the untreated region. The tempering process of the regionally selective tempering process may be configured to appreciably increase a hardness of the target portion of the component relative to a hardness of the remainder portion of the component.

20 Claims, 5 Drawing Sheets

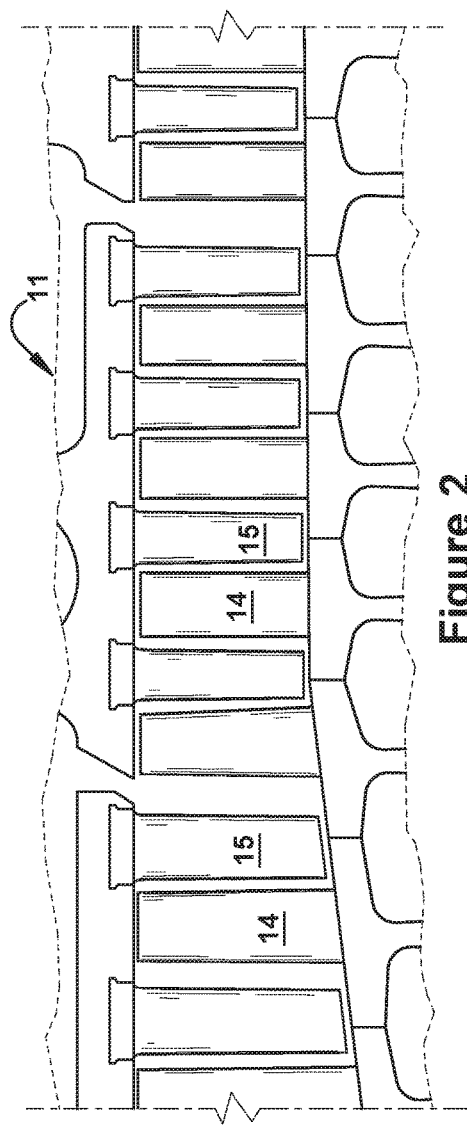
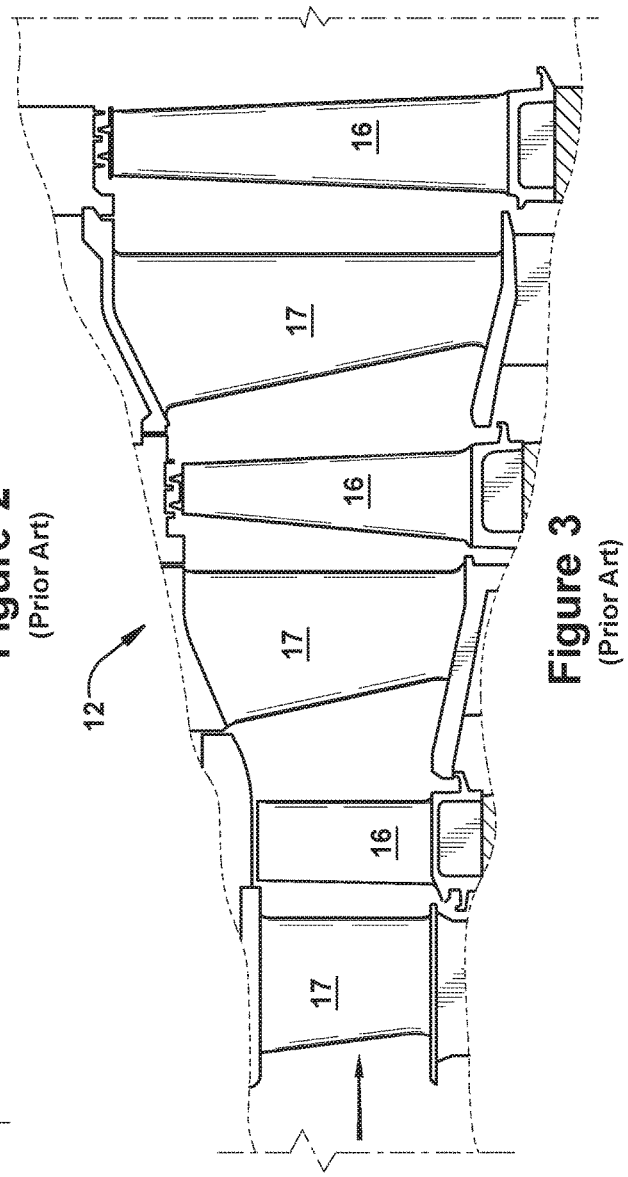

METHOD FOR MANUFACTURING COMPONENTS FOR GAS TURBINE ENGINES

BACKGROUND OF THE INVENTION

The subject matter disclosed herein generally relates to a method of creating hardened, erosion resistant stainless steel. More specifically, but not by way of limitation, the present application relates to a method of manufacturing corrosion resistant stainless steel turbine components with regionally increased hardness for improved erosion resistance.

The metal alloys used to make components of gas turbine engines ("gas turbines"), particularly the compressor airfoils of the rotating and stationary blades, must have a combination of high strength, toughness, fatigue resistance, hardness and other physical and mechanical properties in order to provide the operational properties these machines require. Such blades also must have sufficient resistance to various forms of corrosion and corrosion mechanisms, particularly pitting corrosion, due to the extreme operational environments within the turbine, which include exposure to various ionic reactant species, such as chlorides, sulfates, nitrides, etc. Physical erosion is also significant, particularly with gas turbines using "wet compression" processes to increase output. In such cases, water droplets introduced into the intake air may strike and erode the metal along the leading edge of the airfoils, the area of the blade that is most exposed. As will be appreciated, both erosion and corrosion can diminish the other necessary physical and mechanical properties of the blades, such as the high cycle fatigue strength, initiating surface cracks that propagate under the cyclic thermal and mechanical stresses associated with operation of the turbine. Erosion of the leading edge can also lead to increases in operating costs and fuel consumption due to the inefficiencies of the rotors as well as increased carbon emissions.

As disclosed in U.S. patent application Ser. No. 14/632,159, which is hereby incorporated in its entirety in the present application, it will be appreciated that certain stainless steel alloys provide a desirable degree of pitting corrosion resistance. However, as is typical of stainless steel alloys, such performance benefits may be at least partially negated if the hardness of the material is insufficient to adequately slow physical erosion. For example, with regard to compressor airfoils in gas turbines, there is a desire for an increase in the amount of erosion resistance while maintaining the corrosion resistance, so the airfoils can last longer when used for wet compression.

In view of this, a method for producing stainless steel alloys suitable for use in turbine compressor airfoils, with high resistance to both corrosion and erosion degradation would be highly desirable.

BRIEF DESCRIPTION OF THE INVENTION

The present application thus describes a method of manufacturing a component for a gas turbine engine. The method may include the steps of: providing a forged preform of the component that is made from a stainless steel alloy; identifying two non-overlapping portions of the component that together form a whole of the component: a target portion and a remainder portion; and treating the component with a regionally selective tempering process in which a treated region receives a tempering process while an untreated region is excluded from receiving the tempering process. The target portion may be the treated region while the remainder portion is the untreated region. The tempering process of the regionally selective tempering process may be configured to appreciably increase a hardness of the target portion of the component relative to a hardness of the remainder portion of the component.

The present invention further describes a method of manufacturing an airfoil of a compressor rotor blade of a gas turbine engine. The method may include the steps of: providing a forged preform of the airfoil, the forged preform being made from a stainless steel alloy comprising a martensitic stainless steel alloy that includes, by weight: about 12.0 to about 16.0 percent chromium, greater than 16.0 to about 20.0 percent cobalt, about 6.0 to about 8.0 percent molybdenum, about 1.0 to about 3.0 percent nickel, about 0.02 to about 0.04 percent carbon, and the balance iron and incidental impurities; identifying two non-overlapping portions of the airfoil that together form a whole of the airfoil: a target portion and a remainder portion; treating the airfoil with a non-regionally selective tempering process in which the whole of the airfoil receives a first tempering process; treating the airfoil with a regionally selective tempering process in which a treated region receives a second tempering process while an untreated region is excluded from receiving the second tempering process, the second tempering process including an induction tempering of at least 1000° F. According to exemplary embodiments, the target portion of the airfoil is the treated region and the remainder portion of the airfoil is the untreated region of the regionally selective tempering process. According to exemplary embodiments, the second tempering process of the regionally selective tempering process is configured to increase the hardness of the target portion to at least 51 Rockwell C.

These and other advantages and features will become more apparent from the following description in conjunction with the drawings.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which:

FIG. 2 is a sectional view of the compressor section of the gas turbine of FIG. 1;

FIG. 3 is a sectional view of the turbine section of the gas turbine of FIG. 1;

Figure 1:
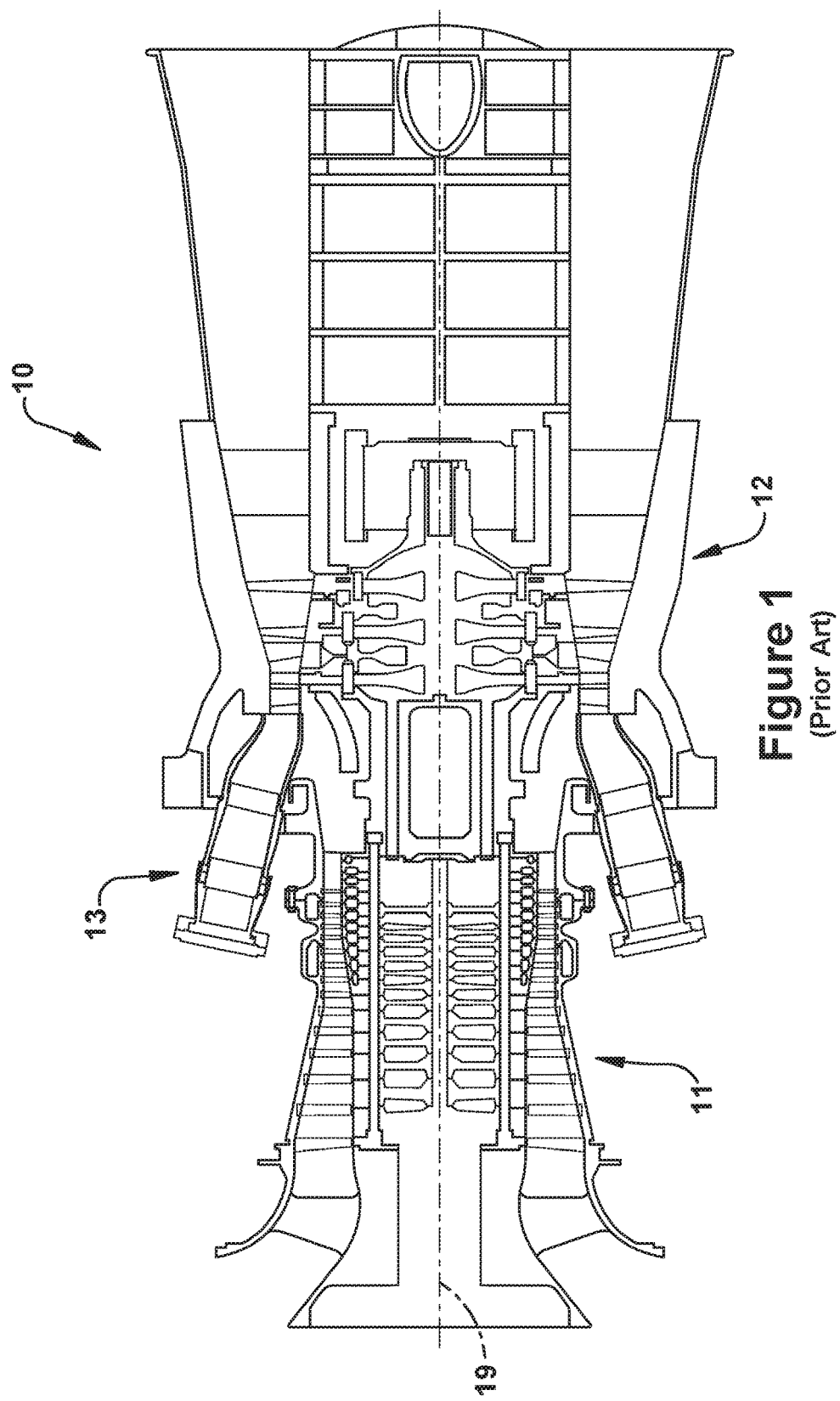
FIG. 1 is a schematic representation of an exemplary gas turbine that may include turbine blades according to aspects and embodiments of the present invention.

The detailed description explains embodiments of the invention, together with advantages and features, by way of example with reference to the drawings.

DETAILED DESCRIPTION OF THE INVENTION

Aspects and advantages of the present application are set forth below in the following description, or may be obvious from the description, or may be learned through practice of the invention. Reference will now be made in detail to present embodiments of the invention, one or more examples of which are illustrated in the accompanying drawings. The detailed description uses numerical designations to refer to features in the drawings. Like or similar designations in the drawings and description may be used to refer to like or similar parts of embodiments of the invention. As will be appreciated, each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. It is intended that the present invention covers such modifications and variations as come within the scope of the appended claims and their equivalents. It is to be understood that the ranges and limits mentioned herein include all sub-ranges located within the prescribed limits, inclusive of the limits themselves unless otherwise stated. Additionally, certain terms have been selected to describe the present invention and its component subsystems and parts. To the extent possible, these terms have been chosen based on the terminology common to the technology field. Still, it will be appreciated that such terms often are subject to differing interpretations. For example, what may be referred to herein as a single component, may be referenced elsewhere as consisting of multiple components, or, what may be referenced herein as including multiple components, may be referred to elsewhere as being a single component. Thus, in understanding the scope of the present invention, attention should not only be paid to the particular terminology used, but also to the accompanying description and context, as well as the structure, configuration, function, and/or usage of the component being referenced and described, including the manner in which the term relates to the several figures, as well as, of course, the precise usage of the terminology in the appended claims. Further, while the following examples are presented in relation to certain types of gas turbines or turbine engines, the technology of the present application also may be applicable to other categories of turbine engines, without limitation, as would be understood by a person of ordinary skill in the relevant technological arts. Accordingly, it should be understood that, unless otherwise stated, the usage herein of the term "gas turbine" is intended broadly and with limitation as the applicability of the present invention to the various types of turbine engines.

Given the nature of how gas turbines operate, several terms prove particularly useful in describing certain aspects of their function. As will be understood, these terms may be used both in describing or claiming the gas turbine or one of the subsystems thereof—e.g., the compressor, combustor, or turbine—as well as to describe or claim components or subcomponents for usage therewithin. In the latter case, the terminology should be understood as describing those components as they would be upon proper installation and/or function within the gas turbine engine or primary subsystem. These terms and their definitions, unless specifically stated otherwise, are as follows.

The terms "forward" and "aftward" refer to directions relative to the orientation of the gas turbine and, more specifically, the relative positioning of the compressor and turbine sections of the engine. Thus, as used therein, the term "forward" refers to the compressor end while "aftward" refers to the turbine end. It will be appreciated that each of these terms may be used to indicate direction of movement or relative position along the central axis of the engine. As stated above, these terms may be used to describe attributes of the gas turbine or one of its primary subsystems, as well as for components or subcomponents positioned therewithin. Thus, for example, when a component, such as a rotor blade, is described or claimed as having a "forward face", it may be understood as referring to a face that faces toward the forward direction as defined by the orientation of the gas turbine (i.e., the compressor being designated as the forward end and turbine being designated as the aftward end). To take a major subsystem like the turbine as another example (and assuming a typical gas turbine arrangement such as the one shown in FIG. 1), the forward and aftward directions may be defined relative to a forward end of the turbine, at where a working fluid enters the turbine, and an aftward end of the turbine, at where the working fluid exits the turbine.

The terms "downstream" and "upstream" are used herein to indicate position within a specified conduit or flowpath relative to the direction of flow (hereinafter "flow direction") moving through it. Thus, the term "downstream" refers to the direction in which a fluid is flowing through the specified conduit, while "upstream" refers to the direction opposite that. These terms may be construed as referring to the flow direction through the conduit given normal or anticipated operation. As will be appreciated, within the compressor and turbine sections of the gas turbine, the working fluid is directed downstream and through an annularly shaped working fluid flowpath, which is typically defined about the central and common axis of the gas engine. As such, within the compressor and turbine sections of the engine, the term "flow direction", as used herein, refers to a reference direction representing an idealized direction of flow of working fluid through the working fluid flowpath of the engine during an expected or normal condition of operation. Thus, within the compressor and turbine sections, the "flow direction" terminology is referring to flow that is parallel to the central axis of the gas turbine and oriented in the downstream or aftward direction.

Thus, for example, the flow of working fluid through the working fluid flowpath of the gas turbine may be described as beginning as air pressurized through the compressor per the flow direction, becoming combustion gases in the combustor upon being combusted with a fuel, and, finally, being expanded per the flow direction as it passed through the turbine. Likewise, the flow of working fluid may be described as beginning at a forward or upstream location toward a forward or upstream end of the gas turbine, moving generally in a downstream or aftward direction, and, finally, terminating at an aftward or downstream location toward an aftward or downstream end of the gas turbine.

In addition, given the configuration of gas turbines, particularly the arrangement of the compressor and turbine sections about a common shaft or rotor, as well as the cylindrical configuration common to many combustor types, terms describing position relative to an axis may be regularly used herein. In this regard, it will be appreciated that the term "radial" refers to movement or position perpendicular to an axis. Related to this, it may be required to describe relative distance from the central axis. In such cases, for example, if a first component resides closer to the central axis than a second component, the first component will be described as being either "radially inward" or "inboard" of the second component. If, on the other hand, the first component resides further from the central axis, the first component will be described as being either "radially outward" or "outboard" of the second component. As used herein, the term "axial" refers to movement or position parallel to an axis, while the term "circumferential" refers to movement or position around an axis. Unless otherwise stated or plainly contextually apparent, these terms should be construed as relating to the central axis of the compressor and/or turbine sections of the gas turbine as defined by the rotor extending through each, even if the terms are describing or claiming attributes of non-integral components—such as rotor or stator blades—that function therein. When otherwise stated, the terms may be used relative to the longitudinal axis of certain components or subsystems within the gas turbine, such as, for example, the longitudinal axis around which conventional cylindrical or "can" combustors are typically arranged.

Finally, the term "rotor blade", without further specificity, is a reference to the rotating blades of either the compressor or the turbine, and so may include both compressor rotor blades and turbine rotor blades. The term "stator blade", without further specificity, is a reference to the stationary blades of either the compressor or the turbine and so may include both compressor stator blades and turbine stator blades. The term "blades" may be used to generally refer to either type of blade. Thus, without further specificity, the term "blades" is inclusive to all type of turbine engine blades, including compressor rotor blades, compressor stator blades, turbine rotor blades, turbine stator blades and the like. Further, the descriptive or standalone term "blade surface" may reference any type of turbine or compressor blade, and may include any or all portions of the blade, including the suction side face, pressure side face, blade tip, blade shroud, platform, root, and shank.

By way of background, referring now to the figures, FIGS. 1 through 3 illustrate an exemplary gas turbine in which embodiments of the present application may be used. It will be understood by those skilled in the art that the present invention is not limited to this type of usage. As stated, the present invention may be used in gas turbines, such as the engines used in power generation and airplanes, steam turbine engines, and other types of rotary engines. The examples provided are not meant to be limiting to the type of the turbine engine. FIG. 1 is a schematic representation of a gas turbine 10. In general, gas turbines operate by extracting energy from a pressurized flow of hot gas produced by the combustion of a fuel in a stream of compressed air. As illustrated in FIG. 1, gas turbine 10 may be configured with an axial compressor 11 that is mechanically coupled by a common shaft or rotor to a downstream turbine section or turbine 12, and a combustor 13 positioned between the compressor 11 and the turbine 12. As illustrated in FIG. 1, the gas turbine may be formed about a common central axis 19.

FIG. 2 illustrates a view of an exemplary multi-staged axial compressor 11 that may be used in the gas turbine of FIG. 1. As shown, the compressor 11 may have a plurality of stages, each of which include a row of compressor rotor blades 14 and a row of compressor stator blades 15. Thus, a first stage may include a row of compressor rotor blades 14, which rotate about a central shaft, followed by a row of compressor stator blades 15, which remain stationary during operation. FIG. 3 illustrates a partial view of an exemplary turbine section or turbine 12 that may be used in the gas turbine of FIG. 1. The turbine 12 also may include a plurality of stages. Three exemplary stages are illustrated, but more or less may be present. Each stage may include a plurality of turbine nozzles or stator blades 17, which remain stationary during operation, followed by a plurality of turbine buckets or rotor blades 16, which rotate about the shaft during operation. The turbine stator blades 17 generally are circumferentially spaced one from the other and fixed about the axis of rotation to an outer casing. The turbine rotor blades 16 may be mounted on a turbine wheel or rotor disc (not shown) for rotation about the shaft (not shown). It will be appreciated that the turbine stator blades 17 and turbine rotor blades 16 lie in the hot gas path or working fluid flowpath through the turbine 12. The direction of flow of the combustion gases or working fluid within the working fluid flowpath is indicated by the arrow.

In one example of operation, the rotation of compressor rotor blades 14 within the axial compressor 11 may compress a flow of air. In the combustor 13, energy may be released when the compressed air is mixed with a fuel and ignited. The resulting flow of hot gases or working fluid from the combustor 13 is then directed over the turbine rotor blades 16, which induces the rotation of the turbine rotor blades 16 about the shaft. In this way, the energy of the flow of working fluid is transformed into the mechanical energy of the rotating blades and, given the connection between the rotor blades and the shaft, the rotating shaft. The mechanical energy of the rotating shaft may then be used to drive the rotation of the compressor rotor blades 14, such that the necessary supply of compressed air is produced, and also, for example, a generator to produce electricity.

Figure 4:
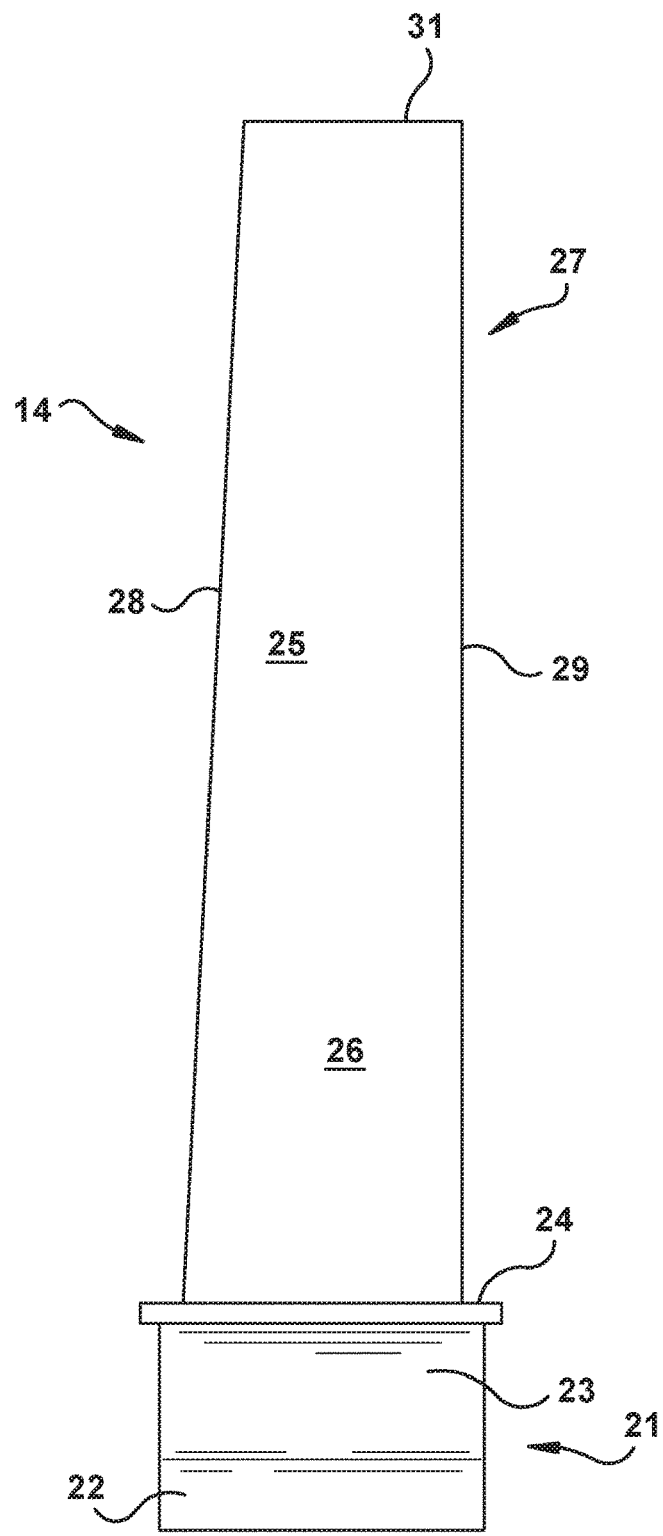
FIG. 4 is a side view of an exemplary compressor blade of the type that may be used with the present invention.

For background purposes, FIG. 4 provides views of an exemplary compressor rotor blade 14 on which aspects of the present invention may be used. It will be appreciated that the present invention may be used on other types of blades or components within the compressor 11 or the gas turbine 10, and that the exemplary blade of FIG. 4 is provided primarily to illustrate and describe basic blade structure and related subcomponents. As illustrated, the rotor blade 14 may include a root 21 by which it attaches to a rotor disc. For example, the root 21 may include a dovetail 22 configured for mounting in a corresponding dovetail slot in the perimeter of a rotor disc. The root 21 may further include a shank 23 that extends between the dovetail 22 and a platform 24. The platform 24, as shown, is disposed at the junction of the root 21 and an airfoil 25 that extends from it. The airfoil 25 may be configured to define a portion of the inboard boundary of the flowpath through the compressor 11. It will be appreciated that the airfoil 25 is the active component of the rotor blade 14 that interacts with the flow of working fluid through the compressor 11. As stated, while the blade of this example is a compressor rotor blade 14, it will be appreciated that, unless otherwise stated, the present invention also may be applied to other types of blades within the gas turbine 10, including compressor stator blades 15. It will be understood that the airfoil 25 of the rotor blade 14 may include a concave pressure side face 26 and a circumferentially or laterally opposite convex suction side face 27 extending axially between opposite leading and trailing edges 28, 29 respectively. The side faces 26 and 27 also extend in the radial direction from the platform 24 to an outboard tip 31 of the airfoil 25. The airfoil 25 and components thereof will be used to describe the present method, but the application of the method herein disclosed is not limited thereto unless specifically stated as such.

The airfoil 25, because of the high speeds of rotation and the speed of the working fluid within the flowpath, is susceptible to erosion, particular at the leading edge 28 and particularly when used for wet compression. Without being limited by theory, such erosion in a gas turbine is believed to be caused by either solid or liquid particles, such as water, present in the intake air impinging the surface of the metal airfoils and removing a layer of the metal, particularly after repeated impingements. Wet compression introduces water droplets into the intake air in order to create an intercooling effect within the compressor when the water evaporates and also to increase the mass flow, which increases the energy output. However, because wet compression greatly increases the amount of water particles in the air, erosion of airfoils can be particularly high when it is used. However, if the hardness of the steel is increased, there is an increase in erosion resistance. Therefore, if the leading edge of the airfoil could be made harder, there would be an increase in erosion resistance. Yet, it is typical of many stainless steel alloys that their hardness decreases when tempered at high temperatures. Therefore, the only current alternative for stainless steel alloys that cannot have their hardness increased without sacrificing other desirable properties is to use erosion-resistant coatings, which can increase the cost of manufacturing the compressor blades.

Erosion as described above is presently observed in service on front stage compressor airfoils, particularly on airfoils in turbines used for wet compression. As disclosed in U.S. patent application Ser. No. 14/632,159, which, as already stated, is incorporated herein in its entirety, a particular martensitic stainless steel alloy provides an increased corrosion resistance when compared to other stainless steel alloys, such as 450 and 450+ stainless steel. In addition to this pitting corrosion resistance property, it has been discovered that unlike many forms of stainless steel alloys, including 450 and 450+ stainless steels, increasing the tempering temperature increases, rather than decreases, the hardness of the steel, which, in turn, increases its erosion resistance. Additionally, it has been discovered that in forging an airfoil for a gas turbine compressor blade, since primarily the leading edge and forward sections of the pressure and suction sides of the airfoil require erosion resistance, after initial tempering at a lower temperature to create the martensitic pitting/corrosion resistant stainless steel alloy, the metal can be tempered (for example, via induction or flame tempering) at a higher temperature to increase hardness in these specific target regions of the blade. In this manner, the erosion resistance of the blade may be enhanced where needed with minimal impact to overall pitting corrosion resistance. As will be appreciated, the remaining airfoil that is not tempered to the higher temperature then would retain the pitting corrosion resistance as outlined in U.S. patent application Ser. No. 14/632,159. The method for a stainless steel alloys with a region of increased hardness for increased erosion resistance described herein is well suited for metals in environments requiring a high degree of corrosion and erosion resistance, particularly turbine airfoils in turbines used for wet compression.

Figure 5:
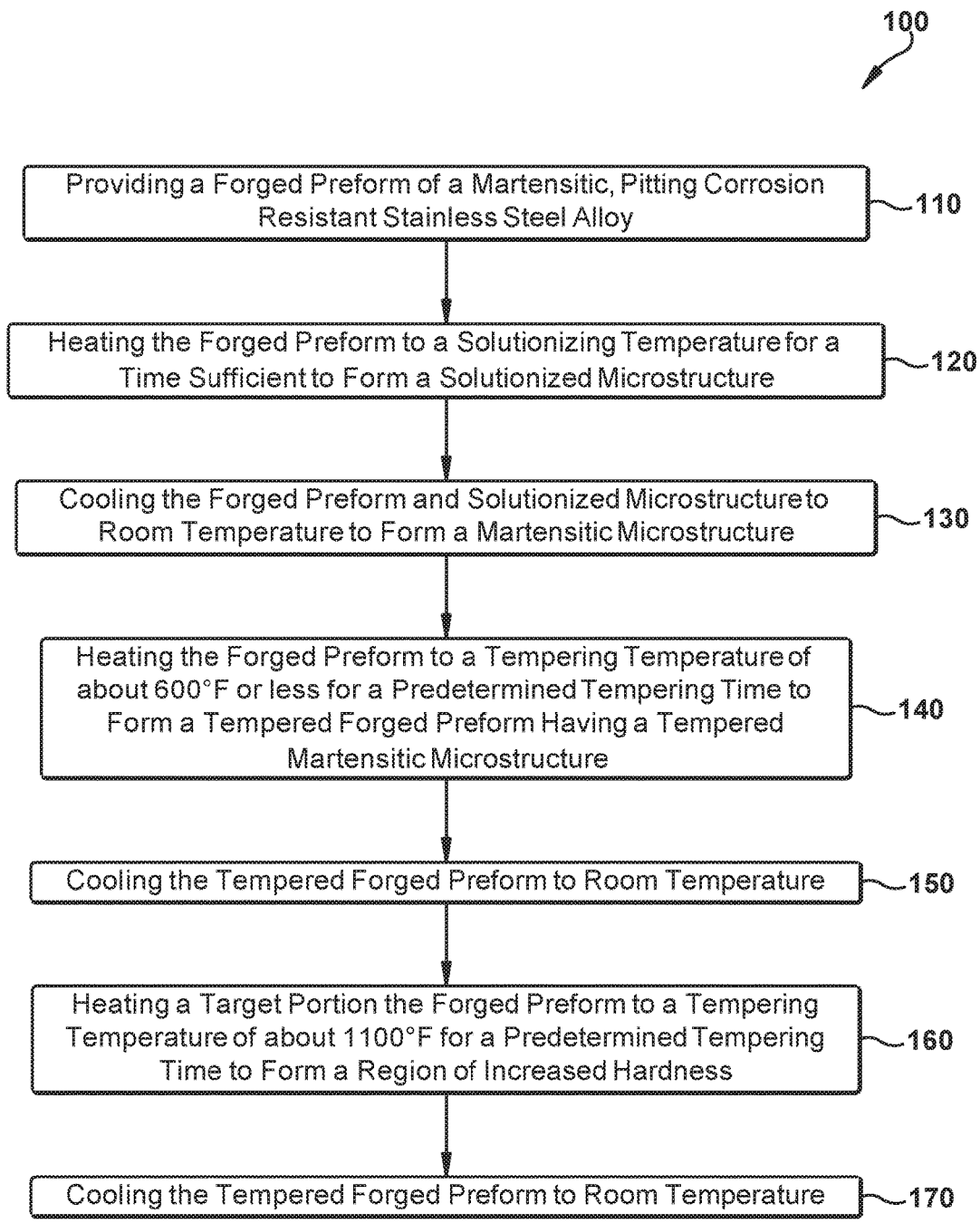
FIG. 5 is a flow chart of an exemplary embodiment of a method of making a stainless steel blade with a leading edge having increased hardness.

Referring to FIG. 5, a method 100 of making a forged, martensitic, corrosion resistant, stainless steel alloy, of which a region is further tempered at a higher temperature to increase hardness and erosion resistance while maintaining adequate corrosion resistance is disclosed. For purposes of description, the method 100 refers to the process of producing an airfoil 25 of a rotor blade 14, but the present method may be applied to a stator blade 15 as well as other parts of the compressor 11 or the gas turbine 10 generally.

The method 100 includes providing (at step 110) a forged preform of martensitic, pitting corrosion resistant stainless steel alloy. In preferred embodiments, the alloy may comprise, by weight: about 12.0 to about 16.0 percent chromium, greater than 16.0 to about 20.0 percent cobalt, about 6.0 to about 8.0 percent molybdenum, about 1.0 to about 3.0 percent nickel, about 0.020 to about 0.040 percent carbon and the balance iron and incidental impurities. The stainless steel alloy may be provided in any suitable manner, including being processed by substantially conventional industrial methods. A suitable forming operation, such a various forging methods, may then be employed to produce bar stocks and forging preforms that have a precursor shape of the desired article, including the various articles described herein, such as, for example, the compressor airfoil 25.

As provided in U.S. patent application Ser. No. 14/632, 159, the whole of the forged preform may be suitably treated and processed so to render it corrosion resistant. This may include the heating (at step 120) the whole of the preform to a solutionizing temperature, and then cooling (at step 130) it to room temperature. The heating (at step 120) of the forged preform may be done at a solutionizing temperature for a time sufficient to form a solutionized microstructure. In one embodiment, the solutionizing temperature may be about 2,000 to about 2,100° F., and the solutionizing time comprises about 1 to about 3 hours. The cooling (at step 130) of the forged preform and solutionized microstructure may then be complete, which may include a cooling to room temperature in a manner to form a martensitic microstructure. Any suitable method of cooling may be employed that provides a cooling rate sufficient to promote a martensitic transformation of the alloy microstructure. In one embodiment, cooling comprises water, polymer, oil, gas, or air quenching. As used herein, the type of heating and cooling performed in steps 120 and 130 may be referred to as a "non-regionally selective process" because the it is not regionally selective, i.e., the whole of the component is subjected to the process.

As illustrated in FIG. 5, a second heating and cooling steps is then included in the present method 100. Thus, according to exemplary embodiments, the method 100 may include heating (at step 140) the forged preform of the turbine compressor airfoil 25 (or other component) to a tempering temperature of about 600° F. for a predetermined time sufficient to form a tempered forged preform having a tempered martensitic microstructure. Any suitable heating method may be employed. In one embodiment, the predetermined tempering time of this step is about 3 to 6 hours. Still further, the method may include cooling (at step 150) the tempered forged preform to room temperature. As will be appreciated, the low tempering temperatures for the preform are utilized to avoid the formation of precipitates, particularly the embrittling chi and laves phases. According to preferred embodiments, the tempering step 140 and the cooling step 150 are done as a non-regionally selective process, which may be referred to as a "non-regionally selective tempering process". This is due to the fact that the whole of the component (instead of a selected or targeted region) is subjected to the tempering heating and cooling described in these steps.

The method 100 may then continue to an additional tempering step 160 and cooling step 170, which, as provided herein, will be performed as a regionally selective process and referred to herein as "regionally selective tempering process". This is due to the fact that this tempering step is limited to a select or targeted region of the forged preform. Accordingly, and as used herein, a regionally selective tempering process includes both "treated region" and "untreated regions", where the treated region receives the tempering treatment and the untreated region is excluded from receiving the tempering treatment. This approach, as will be described herein, may be done so that a material characteristic—in this case, hardness—within the targeted area may be manipulated according to specific need of the area. Thus, in performing the regionally selective tempering process of step 160 and the cooling of step 170, two non-overlapping portions of the subject component may be delineated beforehand for disparate treatment: a target portion 32, which will become the treated region; and a remainder portion 33 (i.e., the portion of the component remaining given the target portion 32), which will become the untreated region.

Figure 6:
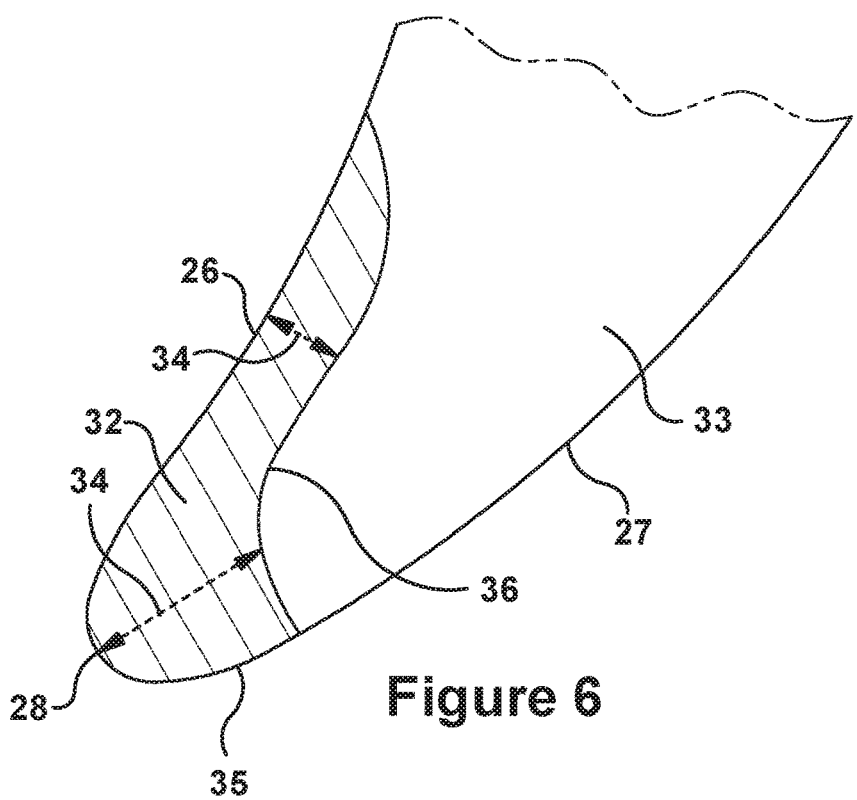
FIG. 6 is a cross-sectional view of an exemplary embodiment of a compressor blade having a hardened leading edge in accordance with the present invention.
Figure 7:
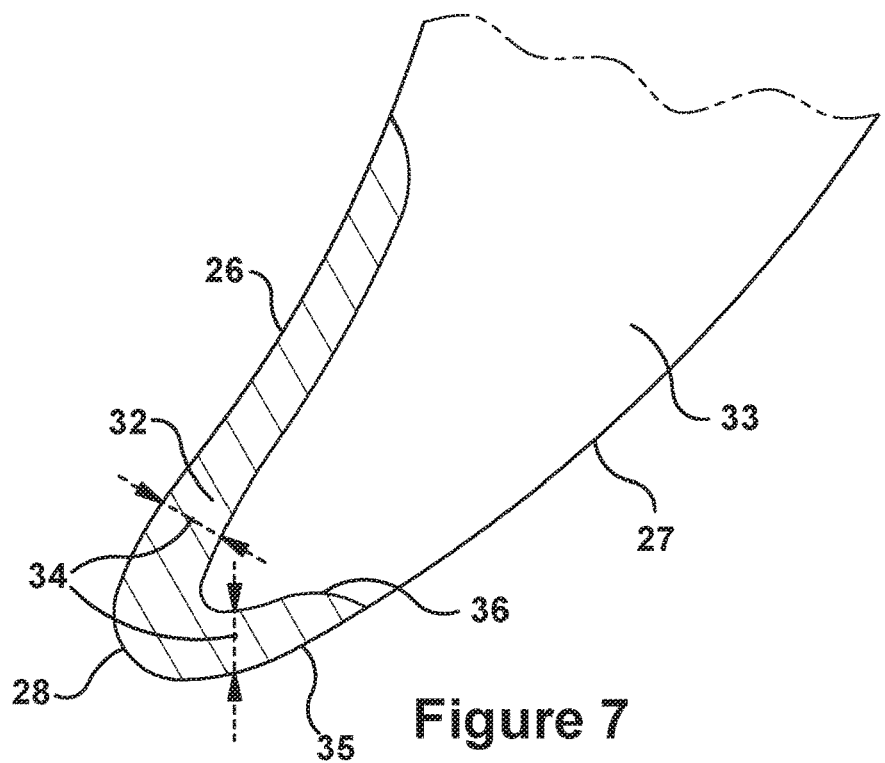
FIG. 7 is a cross-sectional view of an alternative embodiment of a compressor blade having a hardened leading edge in accordance with the present invention.

Thus, the method 100 may include heating (step 160) the target portion 32 of an exemplary component, such as airfoil 25 shown in FIGS. 6 and 7—to provide the target portion 32 with material characteristics that are different from the remainder portion 33 of the component. As will be seen, in the preferred exemplary airfoil case, the target portion 32 may be defined to include part or substantially all of the leading edge 28 of the airfoil 25. The tempering may be accomplished via a heating aimed at or limited to the leading edge 28 and/or adjacent areas thereto, which may include extending segments or legs that extend along the pressure face 26 and the suction face 27 a short distance from the leading edge 28. According to a preferred embodiment, this targeted heating is done via induction tempering. According to an alternative embodiment, flame tempering or any other viable tempering methodologies may be used. According to exemplary embodiments, the tempering may be done at a temperature of between 900 to 1300° F. and last for a predetermined time sufficient to form a tempered forged airfoil having a leading edge that is significantly harder than the remainder of the airfoil. As will be appreciated, this higher tempering temperature causes precipitation and formation of Mo-rich and Co-rich intermetallic phases, which cause a secondary hardening effect. The intermetallic phases may include the laves phase ($Fe_2Mo$), $Fe_7Mo_6$, and FeMo, the sigma phase (Fe—Cr—Mo), and a complex BCC chi phase (Fe—Cr—Mo). While this targeted tempering at the higher temperature may impact the corrosion resisting elements Mo and Cr from the matrix formed during the previous tempering, the impact on the overall corrosion resistance is considered an acceptable tradeoff, particularly given the specific airfoil applications discussed herein.

The targeted heating of step 160 may be performed in any suitable manner or conventional systems. In a preferred embodiment, the target portion 32 of the airfoil 25 may be tempered using scan induction tempering. With reference again to the temperature used at step 160, according to a preferred embodiment, the tempering may be performed by heating the target portion 32 to between about 1000° to 1200° F. for a predetermined time sufficient to form a tempered forged target portion 32 of suitable hardness. More specifically, according to alternative embodiments, the tempering is performed by heating the target portion 32 to between about 1050° and 1150° F. until the desired hardness characteristics are achieved. Even more specifically, according to another embodiment, the tempering may be performed by heating the target portion 32 to about 1100° F. until the desired hardness characteristics are achieved. After heating (step 160), the method may include cooling (step 170) the target portion 32 to room temperature, which may be accomplished by conventional processes.

For the purposes of demonstration and description of the present invention, but not to limit the overall scope of the present invention beyond that provided in the appended claims, FIGS. 6 and 7 show cross-sectional profiles of airfoils 25 having target portions 32 that include preferred location and cross-sectional shapes. According to such embodiments, the target portion 32 may be defined within a radially section of the airfoil 25. According to alternative embodiments, the target portion 32 may extend for a part or substantially all of the radially height of the airfoil 25, as it is defined between the platform 24 and the outboard tip 31. As described, the target portion 32 represents an area of increased hardness—which results from the additional tempering—as compared to the remainder portion 33 of the airfoil 25.

Specifically, the target portion 32, as shown in FIGS. 6 and 7, may be described as the region that occurs between two opposing sides: a first, exterior side 35 (which may be defined by the exterior surfaces of the leading edge 28 and the adjacent surfaces of the pressure face 26 and/or the suction face 27 of the airfoil 25); and a second, interior side 36 (which may be defined within the interior of the airfoil 25 pursuant to an offset 34 from the first, exterior side 35). According to exemplary embodiments, the offset 34 between the exterior side 35 and the interior side 36 of target region 32 is defined as a distance measured perpendicularly from a tangent to the exterior side 35 (i.e., the exterior surface of the airfoil 25). Note that, if a perpendicular measurement from the exterior side 35 does not intersect the interior side 36, as for some points in FIG. 6 this is not possible, then the target area 32 may be assumed as being limited to those areas where the perpendicular measurement from the exterior side 35 does intersect the interior side 36. In one embodiment of the present invention, the offset 34 is less than 0.100 inches. In another embodiment of the method, the offset 34 is at least greater than 0.010 inches. In an additional embodiment, the offset 34 is between 0.020 and 0.050 inches. As stated, the remainder portion 33 of the airfoil 25, which includes the remaining portion of the airfoil 25 that is not within the target portion 32, does not receive the additional tempering of step 160.

As further illustrated in the cross-sectional views of FIGS. 6 and 7, the target portion 32 may alternatively be described as having a pressure-side leg that extends along the surface of the pressure face 26 and a suction-side leg that extends along the surface of the suction face 27. The extent to which the target portion 32 extends from the leading edge 28 toward the trailing edge 29 may be expressed as a ratio between the pressure-side leg/suction-side leg and the corresponding total length of the pressure face 26/suction face 27, respectively. Thus, according to exemplary embodiments, by relative length, the pressure-side leg of the exterior side 35 may be between about 5% and 15% of the total length of the pressure face 26 (as measured between the leading edge 28 and the trailing edge 29 at the radial position that corresponds to the cross-sectional profile). Further, by relative length, the suction-side leg of the exterior side 35 may be between 2% and 15% of a total length of the suction face 27 (as measured between the leading edge 28 and the trailing edge 29 at a radial position that corresponds to the cross-sectional profile). The target portion 32 also may be described by comparing an approximate weight of material contained within the target portion 32 to the overall weight of the airfoil 25. In exemplary embodiments, the target portion 32 of the airfoil 25, by relative weight, is less than 10% of the whole of the airfoil 25. The target portion 32 may further be understood as a surficial region that wraps about the leading edge 28 of the airfoil 25. This surficial region may maintain a depth of between 0.01 and 0.10 inches.

According to exemplary embodiments, the tempering of step 160 and/or the cooling of step 170 may be configured to increase the hardness for the target portion 32 to between about 42 to 56 Rockwell C. More particularly, the tempering of step 160 and/or the cooling of step 170 may be configured to increase the hardness of the target portion 32 to between approximately 51 to 55 Rockwell C. Even more particularly, the tempering of step 160 and/or the cooling of step 170 may be configured to increase the hardness of the target portion 32 to at least 53 Rockwell C.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations are not provided or discussed in detail, though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and equivalents thereof.

That which is claimed:

1. A method of manufacturing a component for a gas turbine engine, the method including the steps of:
   providing a forged preform of the component, the forged preform being made from a stainless steel alloy;
   identifying two non-overlapping portions of the component that together form a whole of the component: a target portion and a remainder portion; and
   treating the component with a regionally selective tempering process configured such that a treated region receives the regionally selective tempering process while an untreated region is prevented from receiving the regionally selective tempering process;
   wherein:
      the target portion comprises the treated region and the remainder portion comprises the untreated region of the regionally selective tempering process; and
      the regionally selective tempering process is configured to appreciably increase a hardness of the target portion of the component relative to a hardness of the remainder portion of the component.

2. The method according to claim 1, wherein the stainless steel alloy comprises a martensitic stainless steel alloy comprising, by weight: about 12.0 to about 16.0 percent chromium, greater than 16.0 to about 20.0 percent cobalt, about 6.0 to about 8.0 percent molybdenum, about 1.0 to about 3.0 percent nickel, about 0.02 to about 0.04 percent carbon, and the balance iron and incidental impurities;
   wherein the component comprises one of: an airfoil of a compressor rotor blade; and an airfoil of a compressor stator blade; and
   wherein the regionally selective tempering process comprises one of: an induction tempering; and a flame tempering.

3. The method according to claim 2, wherein the target portion comprises a region of the airfoil at and adjacent to a leading edge of the airfoil; and
   wherein, by relative weight, the target portion of the component comprises less than 10% of the whole of the component.

4. The method according to claim 1, wherein the stainless steel alloy comprises a martensitic stainless steel alloy comprising, by weight: about 12.0 to about 16.0 percent chromium, greater than 16.0 to about 20.0 percent cobalt, about 6.0 to about 8.0 percent molybdenum, about 1.0 to about 3.0 percent nickel, about 0.02 to about 0.04 percent carbon, and the balance iron and incidental impurities;
   wherein the component comprises one of: a rotor blade; and a stator blade; and
   wherein the regionally selective tempering process comprises one of: an induction tempering; and a flame tempering.

5. The method according to claim 4, wherein the component comprises an airfoil of a compressor rotor blade, the airfoil comprising a concave pressure face and a laterally opposed convex suction face, the pressure face and the suction face extending axially between opposite leading and trailing edges and radially between an inboard end and an outboard tip; and
   wherein the target portion comprises a leading edge of the airfoil.

6. The rotor blade according to claim 5, wherein, assuming a proper installation therein, the airfoil of the compressor rotor blade is describable according to orientation characteristics of the compressor, which include:
   radial, axial, and circumferential directions defined relative to a central axis of the compressor; and
   forward and aftward directions defined relative to a forward end of the compressor, at where an air supply enters the compressor, and an aftward end of the compressor, at where the air supply exits the compressor;
   wherein, according to the orientation characteristics of the compressor:
      the leading edge of the airfoil comprises a forward edge of the airfoil along which the concave pressure face transitions to the convex suction face; and
      the target portion comprises a radial height defined between an inboard boundary and an outboard boundary of the target portion.

7. The method according to claim 6, wherein the target portion comprises a cross-sectional profile that extends between the inboard boundary and the outboard boundary;
   wherein the cross-sectional profile of the target portion is defined between opposing sides:
      a first side defined on exterior surfaces of the pressure face and suction face of the airfoil; and
      a second side defined within an interior of the airfoil according to an offset from the first side, the offset being measured perpendicularly relative to a tangent of the first side.

8. The method according to claim 7, wherein the offset is between 0.02 and 0.05 inches; and
   wherein the regionally selective tempering process comprises the induction tempering.

9. The method according to claim 7, wherein the offset is between 0.01 and 0.10 inches; and
   wherein the regionally selective tempering process comprises the induction tempering.

10. The method according to claim 9, wherein the first side of the cross-sectional profile is intersected by the leading edge of the airfoil so that the first side includes both:
a pressure-side leg that extends aftward along the exterior surface of the pressure face of the airfoil; and
a suction-side leg that extends aftward along the exterior surface of the suction face of the airfoil.

11. The method according to claim 10, wherein:
the pressure-side leg, by relative length, comprises between about 5% and 15% of a total length of the pressure face as measured between the leading edge and the trailing edge at a radial position that corresponds to the cross-sectional profile; and
the suction-side leg, by relative length, comprises between about 2% and 15% of a total length of the suction face as measured between the leading edge and the trailing edge at a radial position that corresponds to the cross-sectional profile.

12. The method according to claim 11, wherein a size and shape of the cross-sectional profile of the target portion is substantially constant between the inboard boundary and the outboard boundary of the target portion; and
wherein the radial height of the target portion comprises at least 25% of a total radial height of the airfoil as measured between the inboard end and outboard tip of the airfoil.

13. The method according to claim 11, wherein the inboard boundary of the target portion comprises the inboard end of the airfoil; and
wherein the outboard boundary of the target portion comprises the outboard tip of the airfoil.

14. The method according to claim 9, further comprising the step of treating the component with a non-regionally selective tempering process configured such that the whole of the component receives a tempering process of the non-regionally selective tempering process;
wherein the step of treating the component with the non-regionally selective tempering process is performed before the step of treating the component with the regionally selective tempering process; and
wherein the non-regionally selective tempering process comprises heating the whole of the component to a temperature of about 600° F. for a predetermined time such that the forged preform comprises a tempered martensitic microstructure.

15. The method according to claim 9, wherein the induction tempering comprises a scan induction tempering.

16. The method according to claim 9, wherein the temperature for the induction tempering is between approximately 900 to 1300° F.; and
wherein the regionally selective tempering process is configured to increase the hardness of the target portion to between about 42 to 56 Rockwell C.

17. The method according to claim 9, wherein the temperature for the induction tempering is between approximately 1000 to 1200° F.; and
wherein the regionally selective tempering process is configured to increase the hardness of the target portion to between about 51 to 55 Rockwell C.

18. The method according to claim 9, wherein the temperature for the induction tempering is between approximately 1050 to 1150° F.; and
wherein the regionally selective tempering process is configured to increase the hardness of the target portion to at least 53 Rockwell C.

19. A method of manufacturing an airfoil of a compressor rotor blade for a gas turbine engine, the method including the steps of:
providing a forged preform of the airfoil, the forged preform being made from a stainless steel alloy comprising a martensitic stainless steel alloy that includes, by weight: about 12.0 to about 16.0 percent chromium, greater than 16.0 to about 20.0 percent cobalt, about 6.0 to about 8.0 percent molybdenum, about 1.0 to about 3.0 percent nickel, about 0.02 to about 0.04 percent carbon, and the balance iron and incidental impurities;
identifying two non-overlapping portions of the airfoil that together form a whole of the airfoil: a target portion and a remainder portion;
treating the airfoil with a non-regionally selective tempering process in which the whole of the airfoil receives a first tempering process;
treating the airfoil with a regionally selective tempering process in which a treated region receives a second tempering process while an untreated region is prevented from receiving the second tempering process, the second tempering process comprising an induction tempering of at least 1000° F.;
wherein:
the target portion of the airfoil comprises the treated region and the remainder portion of the airfoil comprises the untreated region of the regionally selective tempering process; and
the regionally selective tempering process is configured to increase the hardness of the target portion to at least 51 Rockwell C.

20. The method according to claim 19, wherein the target portion comprises a surficial region of the airfoil that wraps about a leading edge of the airfoil and maintains a depth of between 0.01 and 0.10 inches;
wherein, by relative weight, the target portion of the airfoil comprises less than 10% of the whole of the airfoil; and
wherein the first tempering process of the non-regionally selective tempering process comprises heating the whole of the component to a temperature of about 600° F. for a predetermined period of time.

* * * * *